US011228545B1

(12) United States Patent
Chopra et al.

(10) Patent No.: US 11,228,545 B1
(45) Date of Patent: Jan. 18, 2022

(54) CROSS APPLICATION GRANULAR RESTORE OF BACKED-UP EMAIL ATTACHMENTS

(71) Applicant: EMC IP Holding Company LLC, Hopkinton, MA (US)

(72) Inventors: Shelesh Chopra, Bangalore (IN); Sunil Yadav, Bangalore (IN); Amarendra Behera, Bangalore (IN); Ravi Vijayakumar Chitloor, Bengaluru (IN); Himanshu Arora, Bangalore (IN); Tushar Dethe, Bangalore (IN); Deependra Singh, Kanpur (IN); Prabhat Kumar Dubey, Chikkanagamangala (IN); Anjana Rao, Mangalore (IN); Sapna Chauhan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/232,505

(22) Filed: Apr. 16, 2021

(51) Int. Cl.
*H04L 12/58* (2006.01)
*H04L 29/06* (2006.01)
*H04L 29/08* (2006.01)

(52) U.S. Cl.
CPC ............ *H04L 51/08* (2013.01); *H04L 51/063* (2013.01); *H04L 67/1095* (2013.01); *H04L 67/1097* (2013.01); *H04L 67/40* (2013.01)

(58) Field of Classification Search
None
See application file for complete search history.

(56) References Cited

U.S. PATENT DOCUMENTS

| 7,165,082 | B1* | 1/2007 | DeVos | G06F 11/1451 |
| | | | | 707/999.202 |
| 7,257,639 | B1* | 8/2007 | Li | H04L 51/22 |
| | | | | 709/206 |
| 8,285,681 | B2* | 10/2012 | Prahlad | G06F 3/0649 |
| | | | | 707/640 |
| 9,912,625 | B2* | 3/2018 | Mutha | H04L 67/1097 |
| 2001/0047389 | A1* | 11/2001 | Prahlad | H04L 51/08 |
| | | | | 709/206 |
| 2005/0114450 | A1* | 5/2005 | DeVos | H04L 51/08 |
| | | | | 709/206 |
| 2007/0027955 | A1* | 2/2007 | Voss | H04L 51/00 |
| | | | | 709/206 |
| 2008/0126431 | A1* | 5/2008 | Walliser | G06F 11/1456 |
| 2010/0082713 | A1* | 4/2010 | Frid-Nielsen | G06F 16/14 |
| | | | | 707/821 |

(Continued)

*Primary Examiner* — Backhean Tiv
(74) *Attorney, Agent, or Firm* — Dergosits & Noah LLP; Todd A. Noah

(57) ABSTRACT

Described is a system (and method) for cross application granular restore of email attachments backed up to a cloud-based object storage. More particularly, the system may allow various non-email applications to directly restore an email attachment of a backed-up email without requiring restoration of the email itself. The attachment may be a file, item (e.g., contact, event, message, etc.), or another type of attachment such as a link to a file or an item. To provide such a capability, the system may decouple the attachment from an email when performing a backup to an object storage. The system may also store specialized metadata that may be leveraged when performing an efficient restore of the attachment.

20 Claims, 5 Drawing Sheets

(56) References Cited

U.S. PATENT DOCUMENTS

| | | | | |
|---|---|---|---|---|
| 2010/0332401 A1* | 12/2010 | Prahlad | .............. | H04L 63/0428 |
| | | | | 705/80 |
| 2013/0085999 A1* | 4/2013 | Tung | .................. | G06F 11/1451 |
| | | | | 707/654 |
| 2016/0036888 A1* | 2/2016 | Jadhav | ................. | G06F 3/0482 |
| | | | | 715/739 |
| 2016/0088077 A1* | 3/2016 | Liu | .................... | H04L 67/1095 |
| | | | | 709/203 |
| 2016/0142350 A1* | 5/2016 | Mutha | .................... | H04L 51/04 |
| | | | | 709/206 |
| 2016/0315887 A1* | 10/2016 | Uraizee | .................. | H04L 51/36 |
| 2018/0196816 A1* | 7/2018 | Maybee | ............... | G06F 3/0605 |
| 2019/0079928 A1* | 3/2019 | Kumar | ................... | G06F 16/14 |
| 2019/0087280 A1* | 3/2019 | Kumar | ............... | G06F 16/2228 |
| 2019/0294505 A1* | 9/2019 | Hempelmann | ....... | G06F 16/258 |
| 2020/0252358 A1* | 8/2020 | Mutha | .................... | H04L 67/02 |
| 2021/0191822 A1* | 6/2021 | Chopra | .............. | G06F 11/1453 |

\* cited by examiner

CROSS APPLICATION GRANULAR RESTORE OF BACKED-UP EMAIL ATTACHMENTS

TECHNICAL FIELD

This disclosure relates to cloud-based storage systems, and more particularly, providing the ability to restore email attachments backed up to a cloud-based object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. Clients may rely on cloud-based storages to leverage the benefits associated with these systems such as cost efficiency and scalability. These cloud-based systems may implement an object-based storage architecture, and accordingly, client data such as backup data may be stored as objects (or data objects). Clients employing data protection and recovery services often require backup applications to provide tools customized to the type of data being backed up. For example, when email data is backed up, these tools may provide the ability to perform specialized restore (or recovery) operations for backed-up emails. However, when email data is stored as objects, customizable restore operations may not be readily available. For example, the native capabilities of third-party object storages may not directly support granular restore operations associated with backed-up emails. As a result, as the amount of email backup data increases, performing a granularized restore operation becomes increasingly complex. This may in turn increase costs incurred by clients of a cloud-based object storage. Thus, there is a continued need to provide specialized recovery tools for backed-up emails stored on a cloud-based object storage.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
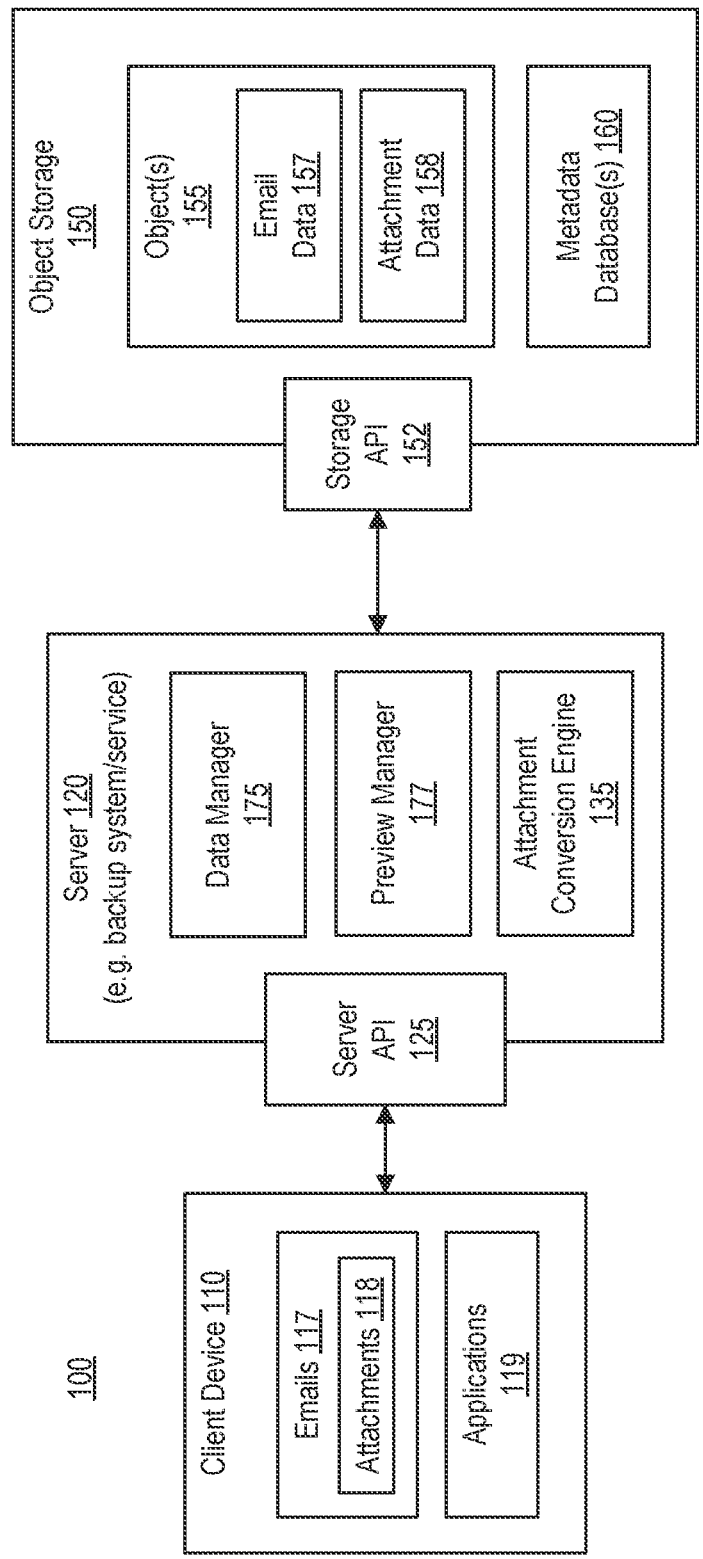
FIG. 1 is a block diagram illustrating an example of an operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used, and changes may be made, without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for cross application granular restore of email attachments backed up to a cloud-based object storage. More particularly, the system may allow various non-email applications of a client device to directly restore an email attachment of a backed-up email. In addition, in some embodiments, the system allows for the restoration of an email attachment without necessarily requiring restoration of the email itself. The attachment may be a file, item (e.g., contact, event, message, etc.), or other type of attachment. The attachment may also be a reference attachment such as a link to a file or an item stored on the client device. To allow a non-email application to directly restore an attachment, the system may convert (or stage) an attachment to a format readable by the non-email application. In other words, an attachment (e.g., a file or item) that was backed up as part of an email may be directly restored by various applications. By way of example, a non-email application may be a word processing application, collaboration application/platform, calendar/task management application, or another type of application. For example, a document attached to a backed-up email may be directly restored and read (or opened) by a word processing application. As another example, an event attached to a backed-up email may be directly restored and read by a collaboration platform. As yet another example, an email message attached to another email may be directly restored and read by the collaboration platform.

In some embodiments, the system may work in conjunction with an application product suite (or platform). For example, the product suite may provide various applications and services as part of a cloud-based service. Accordingly, the system may leverage interoperability tools made available by the product suite provider. For example, the product suite provider may provide various application programming interfaces (APIs) to manage data (e.g., emails, files, items, etc.) created using the product suite. In some embodiments, the system may leverage web-based APIs to allow for certain applications or services of the product suite to directly restore attachments. For example, the system may leverage a REST (representational state transfer, or RESTful) API to obtain (e.g., GET) attachments from a client device (or email server) and restore (e.g., PUT) the backed-up attachments to a file host accessible by applications.

To provide such capabilities, the system may decouple the attachment from its corresponding email when performing a backup. The decoupling process may include retrieving the attachment from a client device and storing the attachment and email separately on the object storage. The system may also store specialized metadata associated with the attachment and/or email as part of a metadata database. This metadata may be leveraged when performing an efficient restore of the attachment. For example, the metadata may be accessed to determine whether an email has any attachments and to determine a storage location for such attachments that may be stored separately from the email. Accordingly, in some embodiments, the system provides an efficient mechanism for providing the ability to directly restore attachments of emails backed up to cloud-based object storage.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g., Solid State Drive (SSD), Hard Disk Drive (HDD)), which may include storage systems provided by a cloud service provider.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g., a cloud-based component/gateway and/or a proxy server) 120, and a cloud-based (or on-demand) object storage 150. In general, the server 120 may act as an intermediary between the client device 110 and the object storage 150. In some embodiments, the server 120 may include a backup system. In some embodiments, the client device 110 (or client data stored by the client device 110) may be associated with a client that is a customer (or subscriber, client, tenant, user, account, etc.) of a backup service or platform (e.g., software/platform-as-a-service) provided by a first entity, as well as a customer of an object storage or service (e.g. software/platform-as-a-service) provided by a different (or second) entity. For example, the server 120 may be provided as part of the backup service provided by the first entity (e.g., Dell EMC), and the object storage 150 may be provided as part of a cloud-based object storage service provided by the different entity (e.g., Amazon S3, Microsoft Azure, IBM Cloud Object Storage, Google Cloud Storage, etc.). In some embodiments, the first entity providing the backup service may also provide (or host) the client device 110 (e.g., as part of a VM).

The client device (or client system) 110 may be associated with client data (or data) that is backed up to the object storage 150. Accordingly, the client device 110 may be a source of, or associated with, client data to be backed up to the object storage 150 such as emails 117. The client device 110 may include, or be associated with, applications 119 that create client data. This may include emails 117, for example, created by an email application. The client data may also include various other types of data that may be created by non-email applications (e.g., word processor, collaboration tool, messaging application, etc.) that may be included as an attachment 118 to an email 177. An attachment 118 may include a file, item (e.g., contact, event, message, etc.), or other type of attachment including a reference attachment. In some embodiments, a file may have context (i.e., file type) outside of an application as a file, whereas an item may have a context (e.g., usable) only within an application. Accordingly, in some embodiments, an item may need to be converted to a file to have context outside of an application. A reference attachment may include a link to a file or an item stored on the client device 110. An attachment 118 may be associated with a particular application 119. For example, an email message may be a file or item type associated with an email application, and thus, another application such as a word processor, not associated with such a file or item type, may not be able to directly read (or open) an email message. As another example, a document may be a file type associated with the word processor, and thus, the word processor may be able to directly read the document. As described, in some embodiments, the applications 119 may part of an application product suite (or platform). For example, the product suite may provide various applications and services as part of a cloud-based service (e.g., Microsoft Office 365). In some embodiments, applications 119 may include an email application (e.g., Outlook), and non-email applications (e.g., Word, SharePoint, Teams, Skype, etc.). In some embodiments, the applications 119 may also include a file host (or cloud-based data storage/drive) that synchronizes files stored on a cloud-based server and the client device 110. Accordingly, as further described herein, data may be restored to a file host to allow cross application access. In some embodiments, the product suite provider (e.g., Microsoft) may provide various APIs (e.g., Microsoft Graph API) to manage data (e.g., emails, files, items, etc.) created using the product suite. It should be noted that although application and product suite examples described herein are associated with Microsoft, other providers (or entities, companies, etc.) of applications, products suites (including cloud-based platforms) are contemplated.

In some embodiments, the client device 110 may include, or work in conjunction with, a cloud-based component (e.g., server) that manages client data. For example, the client device 110 may include, or be associated with, a server (e.g., email server) that manages emails 117 as part of a cloud-based service (e.g., cloud-based email service). For example, in some embodiments, the server 120 may obtain emails 117 (or copies thereof) associated with a client device 110 directly from such an email server.

The object storage (or object storage system) 150 may include a persistent object storage that implements a storage architecture that manages data as an object(s) 155. For example, each object 155 stored by the object storage 150 may include data, meta-data, and/or a globally unique identifier for the object. These objects 155 may store back up data including email data 157 (e.g., backup data of emails 117) and attachment data 158 (e.g., backup data of attachments 118). As described, although attachments 118 are associated with (e.g., contained within) emails 117, the email data 157 and attachment data 158 may be stored separately on the object storage 150. In some embodiments, an object 155 may include a unit of storage used by a cloud-based object storage and may include a collection of objects 155 that may be referred to as containers, buckets, and the like (e.g., depending on the cloud-based storage provider). In some embodiments, the object storage 150 may include various storage tiers (not shown). Accordingly, objects 155 may be distributed amongst these storage tiers (or classes). For example, each storage tier may have different performance characteristics such as latency, storage capacity, bandwidth, durability, etc., and thus, may be associated with different storage costs. For example, the storage cost may include a time-based cost per unit of storage (e.g., GB/month), retrieval costs, performance costs, etc. For instance, higher performance tiers may be associated with increased costs.

As described, the server 120 may act as an intermediary for managing client backup data stored on the object storage 150. In some embodiments, the server 120 (or backup system) may include, or work in conjunction with, various backup components (e.g., products) that can perform backup operations across physical and virtual environments. These backup components (e.g., backup application, backup appliance, backup server, etc.) can be implemented in various forms, such as a virtual, physical, or native public cloud appliance to fit the requirements of a particular configuration, and can be used with various types of data protection environments, including public and private object storage clouds. The server 120 may also provide enhanced security by being a single secure point of access to data stored externally on the object storage 150. For example, a client device 110 may implement a certain network configuration (e.g., firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g., as part of a cloud-based service). Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed through the server 120. For example, the client device 110 may provide (or send, transmit, etc.) client data (or data) to the server 120 using a server API 125. The server 120 may then initiate (or perform, execute, etc.) a corresponding storage operation directly on the object storage using the storage API 152. In some embodiments, the server API 125 may be a REST API that includes a common set of operations that correspond to various data-related operations on the object storage 150. For example, the server API 125 may include operations allowing a client device 110 to store and recover client data backed up to the object storage 150. For example, the server API 125 may allow the client device 110 to read data from an object storage 150, write data to an object storage 150, copy data within the object storage 150, and various other operations for managing data. It should be noted that the same set of operations provided by the server API 125 may be used by the client device 110 irrespective of the type of object storage 150 (e.g., object storage provider). To provide such object-storage-agnostic functionality, the server 120 may include a function library that includes object-storage-specific (or provider-specific) functions. In other words, the function library may include a specific set of functions that are configured to interact with a particular object storage (e.g., object storage provider). Accordingly, the server 120 may use such object-storage-specific functions to interact directly with the object storage 150. For example, the server 120 may initiate data operations directly on the object storage 150 by calling various methods (functions, operations, etc.) of the storage API 152. In some embodiments, the storage API 152 may include only a standard set of storage operations.

As described, the server 120 may manage backed-up client data stored on the object storage 150. Accordingly, the server 120 may include a data manager 175. The data manager (or manager) 175 may coordinate (or manage, orchestrate, execute, automate, etc.) the initiation (or execution) of storage and recovery operations on the object storage 150. In addition, the data manager 175 may direct (or control, initiate, etc.) other components of the operating environment 100 to perform various processes as further described herein. The server 120 may also include a preview manager 177. The preview manager 177 may be part of, or work in conjunction with, the data manager 175 to manage preview information of backed-up emails. The preview manager 177 may provide a user interface that displays preview information as part of an email preview and allows a user to select particular backed-up attachments or emails to restore as further described herein. In some embodiments, the preview manager 177 may also provide a user interface that allows a user to perform and configure various settings associated with providing an email preview. For example, the user interface may allow a user to configure (e.g., input) various settings such as the type of information to provide as part of the preview, a preview limit (e.g., the amount of information to include as part of the preview), and various other settings associated with providing an email preview.

The server 120 may also include an attachment conversion engine 135. The attachment conversion engine 135 may convert backed-up attachments (e.g., attachment data 158) into a format readable by various applications 119 as further described herein. For example, the attachment conversion engine 135 may convert an item attachment associated with a particular application into a format readable by a collaboration application (e.g., Microsoft SharePoint).

To further improve potential storage and recovery efficiency, the server 120 may leverage a specialized metadata database 160. The metadata database 160 may include one or more data stores that may reside on different physical components. The metadata database 160 may be maintained by the server 120. The metadata database 160 may be an embedded database. For example, the metadata database 160 may be created by the server 120 using a particular software library (e.g., SQLite library). The metadata database 160 may reside on the object storage 150, the server 120, and/or another component (e.g., cloud-based component) such that it is accessible by the server 120. In some embodiments, portions of the metadata database 160 may be cached (or stored locally) by the server 120 for efficient access. For example, when restoring an attachment, attachment metadata may be copied to a local storage of the server 120. In some embodiments, when the metadata database 160 resides on the object storage 150, the server 120 may access (e.g., update) the metadata database 160 by accessing the storage API 152.

The metadata database 160 may also store additional metadata associated with client data stored on the client device 110 and/or backed up to the object storage 150. The metadata database 160 may also store various types of backup information associated with the backed-up emails (e.g., email data 157). For example, the metadata database 160 may include a data catalog (or table, database, index, etc.). The data catalog may store information associated with the data stored as part of each backup. In some embodiments, the data catalog may be maintained for a particular account (or sub-account) associated with a client. For example, a data catalog may be maintained for each email account (or user, mailbox, address, etc.). The data catalog may also store various types of backup information associated with the backed-up emails. For example, the backup information may include a point-in-time the backed-up emails were backed up, a storage location of the backed-up emails, an object ID to which the backed-up emails are stored, and various other types of information. The metadata database 160 may also include a backup catalog (or index, table, database, etc.) that stores information associated with each backup performed to the object storage 150. For example, the backup catalog may include backup times specifying when each backup was performed, a backup expiration time, a type of backup (e.g., full or incremental), and any other information that may be associated with performing a backup. In addition, the backup catalog may also include a list of objects required to perform a full restore to each of the backup times. The metadata database 160 may also store attachment metadata (or information) associated with the backed-up attachments (e.g., attachment data 158). For example, the attachment metadata may include information such as the attachment type (e.g., file, item, or other type of attachment), file or item extensions, size (e.g., file or item size), author, times (e.g., creation time, last modified time, etc.), or other types of information that may be associated with an attachment.

Figure 2A:
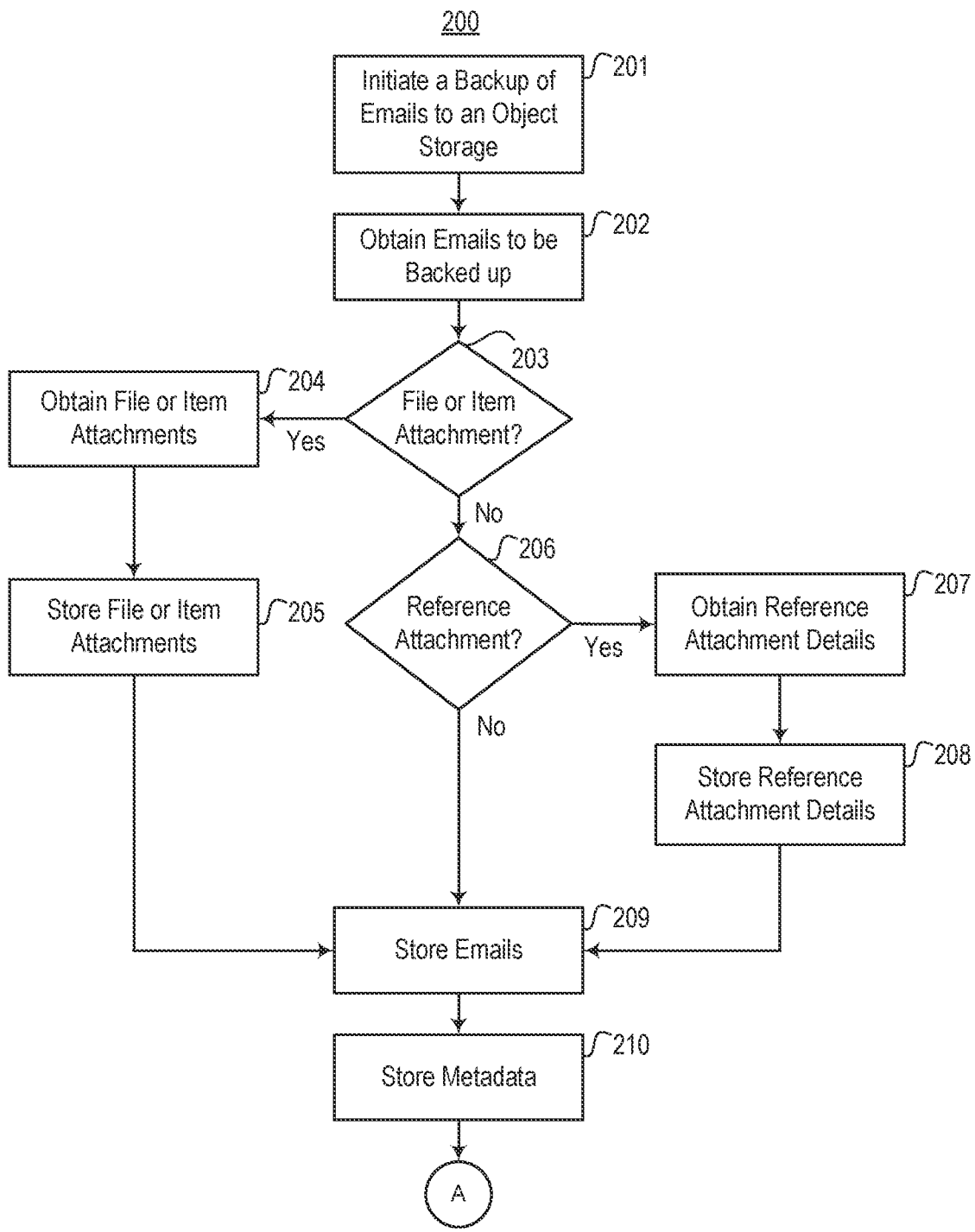
FIGS. 2A and 2B show a process flow diagram illustrating an example process for decoupling an attachment from an email when performing an email back up and restoring the attachment according to one or more embodiments of the disclosure.
Figure 2B:
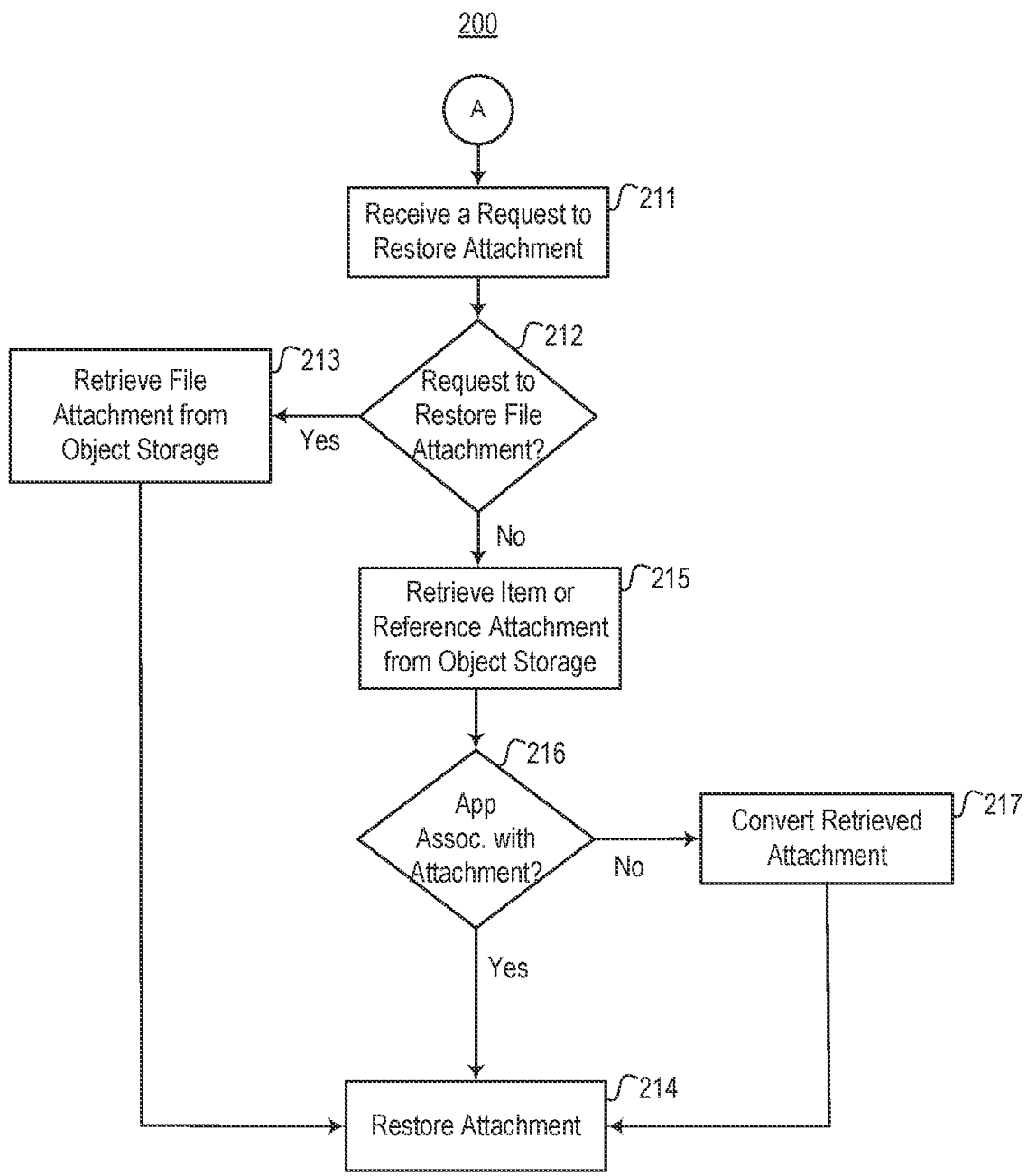

FIGS. 2A and 2B show a process flow diagram illustrating an example process for decoupling an attachment from an email when performing an email back up and restoring the individual attachment according to one or more embodiments of the disclosure. Process 200 may use processing logic, which may include software, hardware, or a combination thereof. For example, process 200 may be performed by a system including one or more components described in operating environment 100 (e.g., server 120, manager 175, etc.).

As shown in FIG. 2A, in 201, the system (e.g., server 120) may initiate a backup of emails to an object storage (e.g., object storage 150). In some embodiments, the system may initiate the backup in response to receiving a request to backup emails from a client device (e.g., client device 110). For example, the backup operation may be initiated by a user associated with the client device, based on a schedule, or in response to detecting a particular event. In 202, the system may obtain (or retrieve, get, download, etc.) the emails (e.g., emails 117) that are to be backed up. The emails may be obtained from a client device, an email server (e.g., cloud-based email server), or another data source. In some embodiments, the system may obtain the emails using an API. For example, a cloud-based email server may provide an API (e.g., representational state transfer API, or REST API) that may be accessed to obtain emails associated with a particular client, account, user, etc. In some embodiments, the system may obtain emails and associated information from email data (e.g., files) that may be in a particular standardized format (e.g., HTML, XML, JSON, etc.). Once the emails are obtained, the system may process the emails as part of a backup operation. This processing may include decoupling any attachments from the emails by storing their backups separately as further described.

In 203, the system may determine whether any emails include (e.g., contain) a file or item attachment. In some embodiments, the system may determine whether an email includes a file or item attachment by analyzing the email data to identify tags (or labels, identifiers, etc.) used to indicate that a particular email includes an attachment (e.g., "hasAttachment=true"). If the system determines an email has a file or item attachment, the system may proceed to 204, otherwise, the system may proceed to 206. In 204, the system may obtain (or retrieve) the file or item from the client device. In some embodiments, the system may retrieve the file or item using an API. For example, the API (e.g., Microsoft Graph API) may be made available by the provider (or entity) associated with an email application. In some embodiments, a file may be associated with a particular application. For example, a file may be a document, and accordingly, may be associated with one or more applications that can read (or open) the document. For example, the document may be a particular file type (e.g., TXT, PDF, WORD, etc.), and therefore, associated with an application that can read the particular file type. Similarly, an item may be associated with one or more applications that can read (or open) the document. For example, the item may be an event, and therefore, associated with an application that can read (or open, modify, process, execute, etc.) the event such as a collaboration platform (or application, tool, etc.). Accordingly, a file or item may be application-specific. In other words, an application-specific file or item may be created or read (or opened) by particular applications. Accordingly, to allow for various applications to read a restored file or item attachment, the system may convert (or stage) the attachment as further described herein.

Once any file or item attachments have been obtained, the system may back up such attachments. In particular, in 205, the system may store (or back up) the obtained file or item attachments on the object storage (e.g., as part of attachment data 158).

If the system determines that the emails do not include any file or item attachments, the system may proceed to 206, and determine whether the emails include (e.g., contain) a reference attachment. As described, a reference attachment may include a link to a file or item. Again, in some embodiments, the system may determine whether an email includes a reference attachment by analyzing the email data to identify tags (or labels, identifiers, etc.) used to indicate that a particular email includes a reference attachment (e.g., "hasRefAttachment=true"). If the system determines the email has a reference attachment, the system may proceed to 207, otherwise, the system may proceed to 209. In 207, the system may obtain the reference attachment details. For example, the reference attachment details may include information associated with the linked file or item such a name (or identifier), storage location on the client device, size, author, permissions associated with the file or item, associated applications, etc. In some embodiments, the system may obtain the reference attachment details via an API. In some embodiments, the system may retrieve and store the actual linked file or item. For example, the system may retrieve the linked file or item from the client device for storage onto the object storage.

Once any reference attachments (e.g., details or linked files or items) are obtained, the system may back up the obtained reference attachments. In particular, in 208, the system may store (or back up) the obtained reference attachments on the object storage (e.g., as part of attachment data 158). However, in some embodiments, the system may store any reference attachment details within a metadata database (e.g., metadata database 160) for relatively quick access.

As described, the system may also back up the emails. In particular, in 209, the system may store (or back up) the emails within objects on the object storage (e.g., as email data 157). In some embodiments, the emails (or email data) may include the email minus any file or item attachments. For example, the email data may include all the necessary information to restore an email including any metadata associated with an attachment (e.g., filenames, sizes of a file or item attachment, etc.), minus any files or items themselves. For example, the email data may include email details such as a sender, recipient(s), subject, date/time sent/received, names/filenames (or identifiers) of any attachments, etc., as well as the message body. In other words, the email data may not include the actual file or item, which may be stored separately as described in 205. However, in some embodiments, the system may also store any attachments as part of the email data. In some embodiments, the stored emails may not include any reference attachments. When storing the email data, the system may perform a processing (or backup processing). This may include processing (e.g., deduplicating, compressing, encrypting, etc.) the obtained emails for storage onto the object storage. In some embodiments, the system may perform an incremental backup, and accordingly, only the new backup data (e.g., new and/or modified emails) may be stored within new objects and the emails backed up as part of previous backups may be retained within existing objects.

In 210, the system may store metadata associated with the emails and/or attachments. In some embodiments, the metadata may be stored as a part of a metadata database (e.g., metadata database 160). In some embodiments, the metadata database may be separate from the objects storing the attachments or emails. For example, the metadata database may an SQL (or SQLite database), and thus, metadata may be retrieved relatively quickly. The metadata may include information linking an email to its attachments, which, as described, may be stored separately. In addition, the metadata may include information specifying the storage location of any attachments and the storage location of the associated (or corresponding, or parent) email. For example, the storage location for an attachment may include the object identifier (ID) of the object storing the attachment. Similarly, the storage location for an email (or email data) may include the object ID of the object storing the email. As described, the metadata may include email metadata (e.g., metadata associated with an email). For example, the email metadata may include information such as a time the email was sent/received, read status, priority status, importance level, attachment sizes, due dates, etc. The metadata may also include attachment metadata (e.g., metadata associated with an attachment). For example, the attachment metadata may include information such as the attachment type (e.g., file, item, or another type of attachment), file or item extensions, size (e.g., file or item size), author, times (e.g., creation time, last modified time, etc.), permission, relationships, or other types of information that may be associated with an attachment.

Once the system stores all the information necessary to provide a cross application granular restore, the system may await the initiation of a restore. Accordingly, the process may continue as further described with reference to FIG. 2B.

As shown in FIG. 2B, process 200 may continue as part of a restore procedure. More particularly, in 211, the system may receive a request to restore an attachment of an email. For example, the restore request may include a request to restore only an attachment (e.g., file, item, or reference attachment) without restoring the corresponding email. The request to restore an attachment may be initiated by a particular application (e.g., requesting application). As described, the attachment may be a file, item, or reference attachment. Accordingly, in 212, the system may determine whether the request includes a request to restore an attachment that is a file attachment. If so, the system may proceed to 213, otherwise, the system may proceed to 215. In 213, the system may retrieve the attachment to be restored. For example, the system may access the metadata database to determine a storage location for the attachment to be retrieved. When the attachment is a file attachment, the system may directly restore the attachment in 214. In other words, when the attachment is a file attachment, in some embodiments, the attachment does not need to be converted and the system may directly provide the retrieved attachment to a file host. The file host may include the client device or a server accessible by the client device (e.g., cloud-based file host). For example, the file host may be a cloud-based file host accessible by the requesting application. In some embodiments, the system may restore the attachment using an API. For example, the API (e.g., Microsoft Graph API) may be made available by the provider (or entity) associated with the file host.

If the attachment is not a file attachment, the attachment may be an item attachment or a reference attachment. Accordingly, in 215, the system may retrieve the item attachment or the reference attachment details. For example, if the attachment is an item attachment, the system may retrieve the item from the object storage. If the attachment is a reference attachment, the system may retrieve the reference attachment details (e.g., linked file or item name, storage location, properties, relationships, etc.). In some embodiments, the reference attachment details may be retrieved from the metadata database. In some embodiments, if the system stored the actual linked file or item, the linked file or item may be retrieved if requested.

In some embodiments, the request to restore an attachment may be received by a particular application (e.g., requesting application). Accordingly, in 216, the system may determine whether the requesting application is associated with the type of attachment of the restore request. If so, the requesting application would be able to read (or open) the attachment, and thus, no conversion is necessary, and the system may proceed to restore the retrieved attachment in 214. Otherwise, if the application is not associated with the attachment, in 217, the system may convert the retrieved attachment. For example, the attachment may be an application-specific item that is different than the requesting application. Accordingly, the system may convert the retrieved attachment into a format readable by the requesting application. For example, the system may convert an item attachment (or reference attachment) into a format readable by the requesting application. In some embodiments, this may be a requesting-application-specific conversion. However, in some embodiments, the system may covert the attachment into a general format. For example, the system may convert an item attachment into a structured document (e.g., HTML, XML, JSON, etc.) that may be read by the requesting application. In some embodiments, if the attachment is a reference attachment, the system may convert the format of the reference attachment details into a format readable (or linkable) by the requesting application. Similarly, if the system stored the actual linked file or item of reference attachment, the system may convert the linked file or item. Once any necessary conversion is completed, the system may proceed to 214, and restore the converted attachment. As described, the system may restore the converted attachment to a file host (e.g., via an API).

Figure 3:
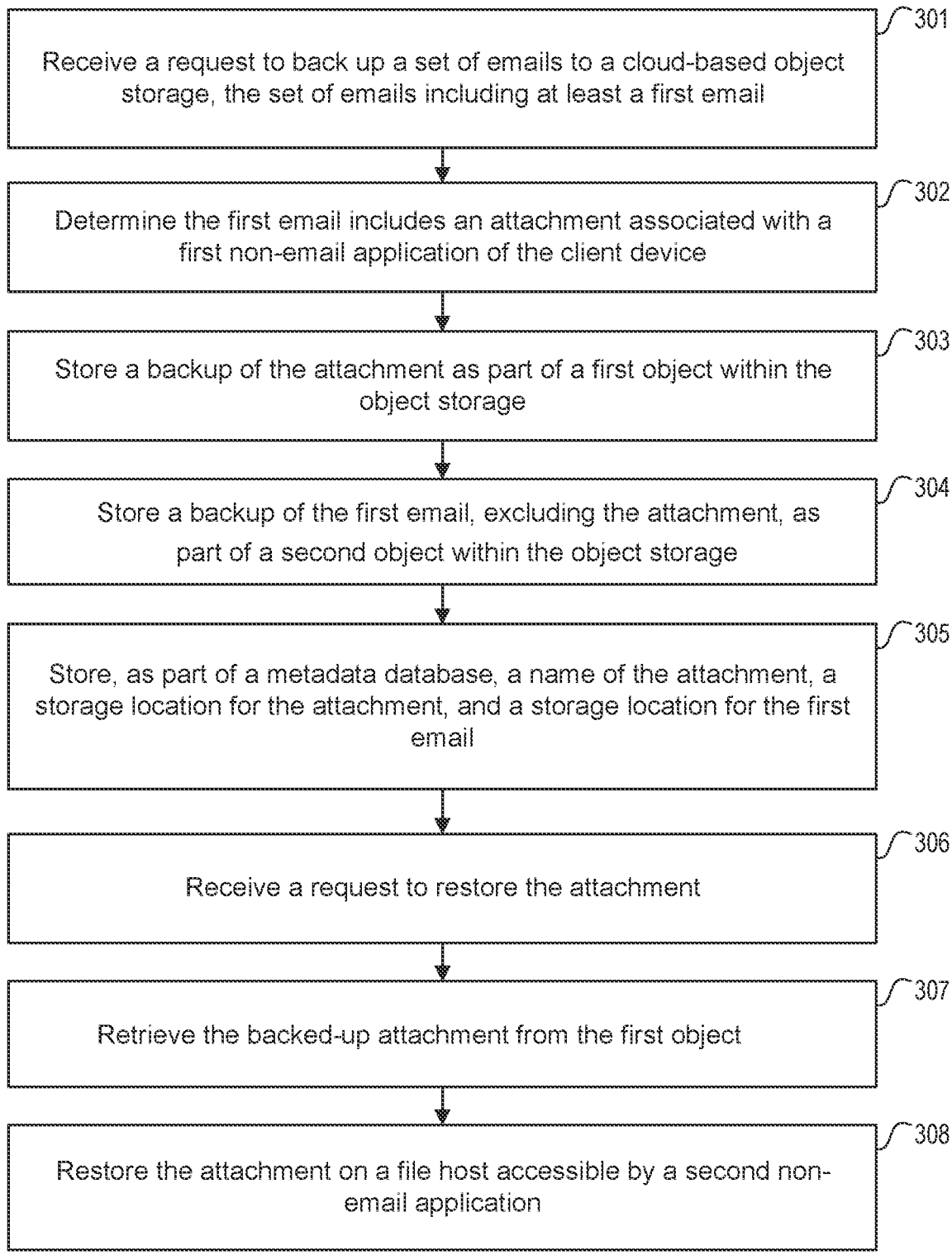
FIG. 3 is a flow diagram illustrating an example method of restoring an attachment of a backed-up email according to one or more embodiments of the disclosure.

FIG. 3 is a flow diagram illustrating an example method of restoring an attachment of a backed-up email according to one or more embodiments of the disclosure. Process 300 may use processing logic, which may include software, hardware, or a combination thereof. For example, process 300 may be performed by a system including one or more components described in operating environment 100 (e.g., server 120, manager 175, etc.).

In 301, the system (e.g., server 120) may receive a request to back up a set of emails (e.g., emails 117) to a cloud-based object storage (e.g., object storage 150). The set of emails may include at least a first email. In some embodiments, the set of emails may be associated with an email application (e.g., Outlook) of a client device (e.g., client device 110). In some embodiments, the email application may be part of a cloud-based application suite (e.g., Office 365).

In 302, the system may determine the first email includes an attachment (e.g., attachment 118) associated with a first non-email application of the client device. For example, the attachment may be a document (e.g., document file) associated with a word processing application (e.g., Word).

In 303, the system may store a backup of the attachment as part of a first object within the object storage. In some embodiments, the system may retrieve the attachment from the client device, prior to storing the backup of the attachment as part of the first object. In some embodiments, retrieving the attachment may include a request, via an API associated with the email application or product suite provider (e.g., Microsoft Graph API), a GET request to retrieve the attachment from the client device or server (e.g., email server). The GET request may specify an identifier of the attachment and/or other required information such as a storage location.

In 304, the system may store a backup of the first email, excluding the attachment, as part of a second object within the object storage. For example, the system may store details of the first emails (e.g., sender, recipient(s), subject, attachment metadata), message body (e.g., content), and other components of the email, but not the actual attachment (e.g., document file) itself.

In 305, the system may store, as part of a metadata database, a name of the attachment, an identifier for the first object as a storage location for the attachment, and an identifier for the second object as a storage location for the first email.

In 306, the system may receive a request to restore the attachment. In some embodiments, the request may be received from a second non-email application (e.g., SharePoint) of the client device. In some embodiments, the request to restore the backed-up attachment may include a request to restore only the backed-up attachment. In some embodiments, the system may provide a preview of emails that may be restored. For example, based on a provided preview, a user may select a particular attachment to restore. Accordingly, in some embodiments, the system may provide a name of the attachment as part of a listing of backup data stored by the object storage. Thus, the request to restore the attachment may specify the name of the attachment, based on the preview.

In 307, the system may retrieve the backed-up attachment from the first object. Accordingly, in some embodiments, the system may retrieve the necessary information to restore the attachment without accessing the backed-up email (or second object). In some embodiments, the system may determine, prior to retrieving the backed-up attachment, the storage location for the backed-up attachment by accessing the metadata database.

In 308, the system may restore the attachment. In some embodiments, the system may restore the attachment on a file host (e.g., OneDrive) accessible by the second non-email application. In some embodiments, the restore may be performed using the backed-up attachment and without accessing the second object.

In some embodiments, restoring the attachment may include providing, via an API associated with the file host or provider associated with file host (e.g., Microsoft Graph API), a PUT request to create a first file on the file host. The PUT request may specify the name of the attachment as a filename for the first file, and the retrieved attachment as content for the first file.

As described, the system may also restore item attachments. Accordingly, in some embodiments, the system may determine whether the attachment is an item attachment. In some embodiments, the second non-email application may not be associated with the item attachment. Accordingly, in response to a determination the attachment is an item attachment, the system may convert, prior to restoring the attachment, the retrieved attachment into a format readable by the second non-email application.

In some embodiments, the set of emails may include a second email, and the system may determine the second email includes a reference attachment. For example, the reference attachment may be a link to a file or item stored by the client device and associated with the first non-email application. Accordingly, the system may store a backup of the reference attachment and a backup of the second email within the object storage. In some embodiments, despite the reference attachment only including a link, the system may retrieve the linked file or item. In some embodiments, the system may receive, from a second non-email application, a request to restore the reference attachment. In some embodiments, the system may restore only the reference attachment details. Accordingly, the system may retrieve the reference attachment details from the object storage and convert the reference attachment details into a format readable by the second non-email application. For example, only the link, and not the actual linked file or item, may be converted into a format accessible by the second application. However, in some embodiments, the system may retrieve the linked file or item, and accordingly, convert the linked file or item into a format readable by the second non-email application. Accordingly, in either scenario, the system may then restore the reference attachment details or referenced file or item by creating a second file on the file host using the converted reference attachment.

Figure 4:
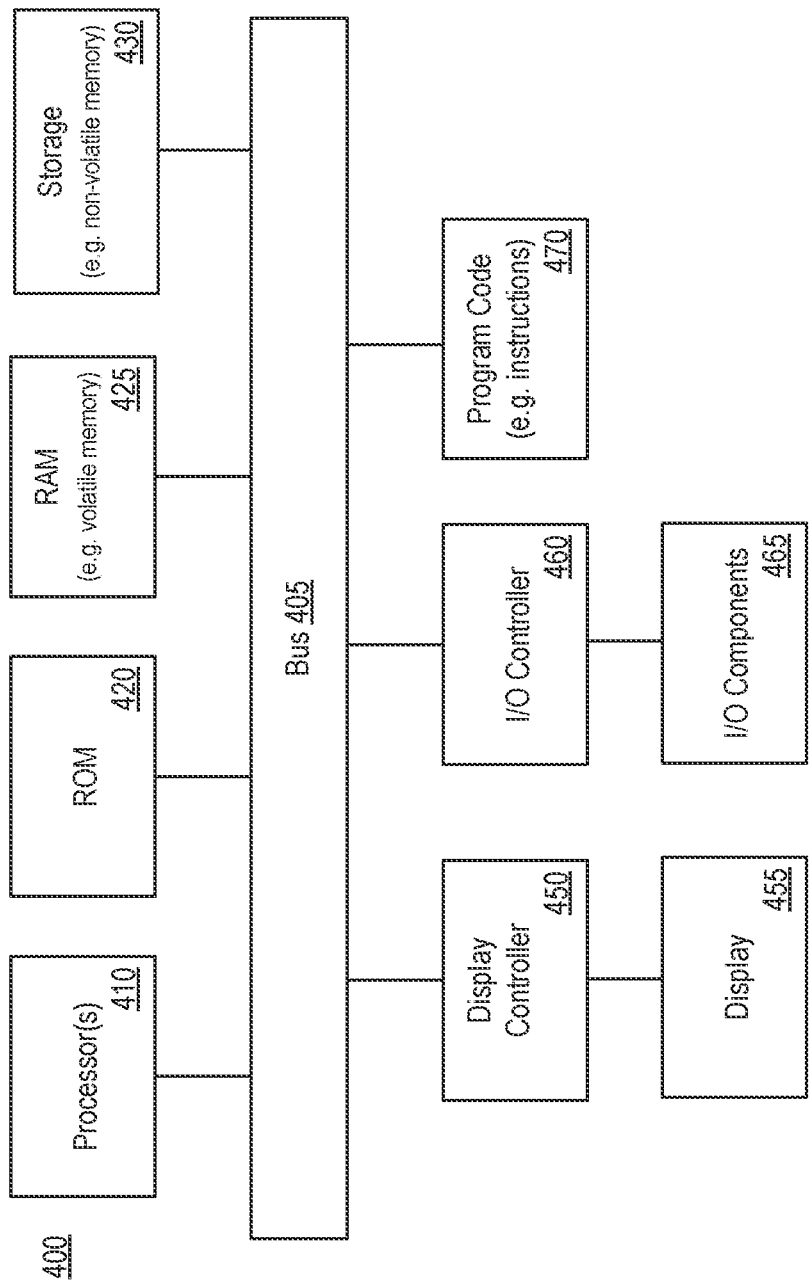
FIG. 4 is a block diagram illustrating an example of a computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g., server 120, client device 110, object storage 150, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g., within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g., within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g., accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g., server 120, manager 175/177, engine 135, etc.). Program code 470 may reside, completely or at least partially, within the memories described herein (e.g., non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g., any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g., and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer-readable medium storing a plurality of instructions, which when executed, cause the one or more processors to:
   receive a request to back up a set of emails to a cloud-based object storage, the set of emails associated with an email application and including at least a first email;
   determine the first email includes an attachment associated with a first non-email application of the client device;
   store a backup of the attachment as part of a first object within the object storage;
   store a backup of the first email, excluding the attachment, as part of a second object within the object storage;
   receive a request to restore the attachment;
   retrieve the backed-up attachment from the first object; and
   restore the attachment on a file host accessible by a second non-email application, the restore performed using the backed-up attachment and without accessing the second object.

2. The system of claim 1, wherein the plurality of instructions, when executed, further cause the one or more processors to:
   store, as part of a metadata database, a name of the attachment, an identifier for the first object as a storage location for the attachment, and an identifier for the second object as a storage location for the first email; and
   determine, prior to retrieving the backed-up attachment, the storage location for the backed-up attachment by accessing the metadata database.

3. The system of claim 2, wherein restoring the attachment on the file host includes:
   providing, via an application programming interface (API) associated with the file host, a PUT request to create a first file on the file host, the PUT request specifying the name of the attachment as a filename for the first file, and the retrieved attachment as content for the first file.

4. The system of claim 1, wherein the plurality of instructions, when executed, further cause the one or more processors to:
   determine whether the attachment comprises an item attachment; and
   convert, prior to restoring the attachment, the retrieved attachment into a format readable by the second non-email application, in response to a determination the attachment comprises the item attachment.

5. The system of claim 1, wherein the plurality of instructions, when executed, further cause the one or more processors to:
   determine a second email of the set of emails includes a reference attachment, the reference attachment comprising a link to a file or item stored by the client device and associated with the first non-email application;
   store a backup of the reference attachment and a backup of the second email within the object storage;
   receive a request to restore the reference attachment;
   retrieve the reference attachment from the object storage;
   convert the reference attachment into a format readable by the second non-email application; and
   restore the reference attachment by creating a second file on the file host using the converted reference attachment.

6. The system of claim 1, wherein the plurality of instructions, when executed, further cause the one or more processors to:
   provide a name of the attachment as part of a listing of backup data stored by the object storage, and wherein the request to restore the attachment includes the name of the attachment.

7. The system of claim 1, wherein the request to restore the attachment is received from a second non-email application of the client device and includes a request to restore only the attachment.

8. The system of claim 1, wherein the plurality of instructions, when executed, further cause the one or more processors to:
   retrieve the attachment from the client device, prior to storing the backup of the attachment as part of the first object.

9. A method comprising:
   receiving, by a server, a request to back up a set of emails to a cloud-based object storage, the set of emails associated with an email application and including at least a first email;
   determining the first email includes an attachment associated with a first non-email application of the client device;
   storing a backup of the attachment as part of a first object within the object storage;
   storing a backup of the first email, excluding the attachment, as part of a second object within the object storage;
   receiving a request to restore the attachment;
   retrieving the backed-up attachment from the first object; and
   restoring the attachment on a file host accessible by a second non-email application, the restore performed using the backed-up attachment and without accessing the second object.

10. The method of claim 9, further comprising:
    storing, as part of a metadata database, a name of the attachment, an identifier for the first object as a storage location for the attachment, and an identifier for the second object as a storage location for the first email; and
    determining, prior to retrieving the backed-up attachment, the storage location for the backed-up attachment by accessing the metadata database.

11. The method of claim 10, wherein restoring the attachment on the file host includes:
providing, via an application programming interface (API) associated with the file host, a PUT request to create a first file on the file host, the PUT request specifying the name of the attachment as a filename for the first file, and the retrieved attachment as content for the first file.

12. The method of claim 9, further comprising:
determining whether the attachment comprises an item attachment; and
converting, prior to restoring the attachment, the retrieved attachment into a format readable by the second non-email application, in response to a determination the attachment comprises the item attachment.

13. The method of claim 9, further comprising:
determining a second email of the set of emails includes a reference attachment, the reference attachment comprising a link to a file or item stored by the client device and associated with the first non-email application;
storing a backup of the reference attachment and a backup of the second email within the object storage;
receiving a request to restore the reference attachment;
retrieving the reference attachment from the object storage;
converting the reference attachment into a format readable by the second non-email application; and
restoring the reference attachment by creating a second file on the file host using the converted reference attachment.

14. The method of claim 9, further comprising:
providing a name of the attachment as part of a listing of backup data stored by the object storage, and wherein the request to restore the attachment includes the name of the attachment.

15. A computer program product comprising a non-transitory computer-readable medium having a computer-readable program code embodied therein to be executed by one or more processors, the program code including instructions to:
receive a request to back up a set of emails to a cloud-based object storage, the set of emails associated with an email application and including at least a first email;
determine the first email includes an attachment associated with a first non-email application of the client device;
store a backup of the attachment as part of a first object within the object storage;
store a backup of the first email, excluding the attachment, as part of a second object within the object storage;
receive a request to restore the attachment;
retrieve the backed-up attachment from the first object; and
restore the attachment on a file host accessible by a second non-email application, the restore performed using the backed-up attachment and without accessing the second object.

16. The computer program product of claim 15, wherein the program code includes further instructions to:
store, as part of a metadata database, a name of the attachment, an identifier for the first object as a storage location for the attachment, and an identifier for the second object as a storage location for the first email; and
determine, prior to retrieving the backed-up attachment, the storage location for the backed-up attachment by accessing the metadata database.

17. The computer program product of claim 16, wherein restoring the attachment on the file host includes:
providing, via an application programming interface (API) associated with the file host, a PUT request to create a first file on the file host, the PUT request specifying the name of the attachment as a filename for the first file, and the retrieved attachment as content for the first file.

18. The computer program product of claim 15, wherein the program code includes further instructions to:
determine whether the attachment comprises an item attachment; and
convert, prior to restoring the attachment, the retrieved attachment into a format readable by the second non-email application, in response to a determination the attachment comprises the item attachment.

19. The computer program product of claim 15, wherein the program code includes further instructions to:
determine a second email of the set of emails includes a reference attachment, the reference attachment comprising a link to a file or item stored by the client device and associated with the first non-email application;
store a backup of the reference attachment and a backup of the second email within the object storage;
receive a request to restore the reference attachment;
retrieve the reference attachment from the object storage;
convert the reference attachment into a format readable by the second non-email application; and
restore the reference attachment by creating a second file on the file host using the converted reference attachment.

20. The computer program product of claim 15, wherein the program code includes further instructions to:
provide a name of the attachment as part of a listing of backup data stored by the object storage, and wherein the request to restore the attachment includes the name of the attachment.

* * * * *